US012809783B2

(12) United States Patent
Govindarajan et al.

(10) Patent No.: US 12,809,783 B2

(45) Date of Patent: Nov. 24, 2026

(54) REAL TIME INPUT/OUTPUT ADDRESS TRANSLATION FOR VIRTUALIZED SYSTEMS

(71) Applicant: TEXAS INSTRUMENTS INCORPORATED, Dallas, TX (US)

(72) Inventors: Sriramakrishnan Govindarajan, Bangalore (IN); Gregory Raymond Shurtz, Houston, TX (US); Mihir Narendra Mody, Bangalore (IN); Charles Lance Fuoco, Allen, TX (US); Donald E. Steiss, Richardson, TX (US); Jonathan Elliot Bergsagel, Richardson, TX (US); Jason A. T. Jones, Richmond, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/346,309

(22) Filed: Jul. 3, 2023

(65) Prior Publication Data

US 2023/0350811 A1 Nov. 2, 2023

Related U.S. Application Data

(63) Continuation of application No. 17/171,185, filed on Feb. 9, 2021, now Pat. No. 11,693,787, which is a continuation of application No. 16/256,821, filed on Jan. 24, 2019, now Pat. No. 10,949,357.

(51) Int. Cl.

| | |
|---|---|
| ***G06F 12/1027*** | (2016.01) |
| ***G06F 9/455*** | (2018.01) |

(52) U.S. Cl.
CPC ...... *G06F 12/1027* (2013.01); *G06F 9/45558* (2013.01); *G06F 2009/45583* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 2008/0114906 | A1 | 5/2008 | Hummel et al. | |
| 2018/0165218 | A1 * | 6/2018 | Parker | G06F 12/1009 |
| 2018/0173641 | A1 | 6/2018 | Parker et al. | |
| 2018/0293183 | A1 | 10/2018 | Cooray et al. | |
| 2019/0155634 | A1 | 5/2019 | Parker | |
| 2019/0163645 | A1 | 5/2019 | Zeng et al. | |

* cited by examiner

*Primary Examiner* — Michael Alsip
(74) *Attorney, Agent, or Firm* — Kenneth Liu; Charles F. Koch

(57) ABSTRACT

In an example, a device includes a memory and a processor core coupled to the memory via a memory management unit (MMU). The device also includes a system MMU (SMMU) cross-referencing virtual addresses (VAs) with intermediate physical addresses (IPAs) and IPAs with physical addresses (PAs). The device further includes a physical address table (PAT) cross-referencing IPAs with each other and cross-referencing PAs with each other. The device also includes a peripheral virtualization unit (PVU) cross-referencing IPAs with PAs, and a routing circuit coupled to the memory, the SMMU, the PAT, and the PVU. The routing circuit is configured to receive a request comprising an address and an attribute and to route the request through at least one of the SMMU, the PAT, or the PVU based on the address and the attribute.

20 Claims, 9 Drawing Sheets

REAL TIME INPUT/OUTPUT ADDRESS TRANSLATION FOR VIRTUALIZED SYSTEMS

CROSS-REFERENCE TO RELATED APPLICATIONS

This application is a continuation of U.S. patent application Ser. No. 17/171,185, filed Feb. 9, 2021, which is a continuation of U.S. patent application Ser. No. 16/256,821, filed Jan. 24, 2019, now U.S. Pat. No. 10,949,357, each of which is incorporated by reference herein in its entirety.

SUMMARY

In accordance with at least one example of the disclosure, a device comprises a memory, a processor core coupled to the memory via a memory management unit (MMU), a system MMU (SMMU) cross-referencing virtual addresses (VAs) with intermediate physical addresses (IPAs) and IPAs with physical addresses (PAs), a physical address table (PAT) cross-referencing IPAs with each other and cross-referencing PAs with each other, a peripheral virtualization unit (PVU) cross-referencing IPAs with PAs, and a routing circuit coupled to the memory, the SMMU, the PAT, and the PVU. The routing circuit is configured to receive a request comprising an address and an attribute and to route the request through at least one of the SMMU, the PAT, or the PVU based on the address and the attribute.

In accordance with at least one example of the disclosure, a device comprises a routing circuit configured to couple to a peripheral device and a system memory management unit (SMMU) coupled to the routing circuit, the SMMU comprising a translation buffer unit (TBU) and a translation control unit (TCU). The device also comprises a physical address table (PAT) coupled to the routing circuit, a peripheral virtualization unit (PVU) coupled to the routing circuit, and a memory coupled to the routing circuit, the SMMU, the PAT, and the PVU.

In accordance with at least one example of the disclosure, a method comprises a routing circuit receiving a request from a peripheral device, the request comprising an address and an attribute. The method also comprises the routing circuit determining a type of the attribute, and, in response to the attribute being a first type, the routing circuit forwarding the request to a system memory management unit (SMMU), the SMMU configured to translate the address. The method further comprises, in response to the address matching an address in a physical address table (PAT), the routing circuit forwarding the request to the PAT, the PAT configured to translate the address, and, in response to the address not matching an address in the PAT and the attribute being a second type, the routing circuit selecting a peripheral virtualization unit (PVU) instance from a plurality of PVU instances, the PVU instance configured to translate the address.

BRIEF DESCRIPTION OF THE DRAWINGS

For a detailed description of various examples, reference will now be made to the accompanying drawings in which.

DETAILED DESCRIPTION

Figure 1:
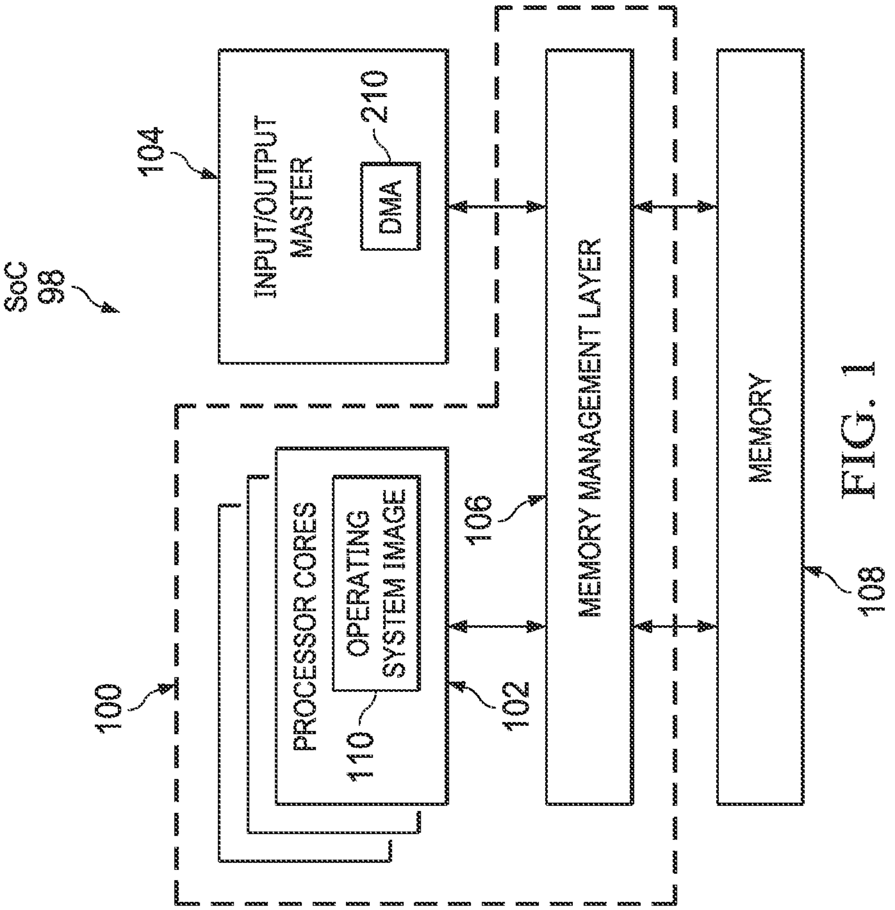
FIG. 1 depicts a block diagram of an illustrative processor and input/output (I/O) system in accordance with an example.

Computer systems include processors that handle a variety of tasks. A processor can include different components, such as one or more caches, buses, and the like, but the component primarily responsible for the processor's operation is the processor core. To perform its functions, the processor core uses memory (e.g., random access memory (RAM)) to hold data, reading and writing to memory repeatedly throughout its operation.

Memory is typically shared by multiple components and processes of the computer system. However, the memory available to any particular component or any particular process is not necessarily contiguous. For example, the memory used by a processor core may span a first range of addresses and a second range of addresses, with another component or process accessing a third range of addresses between the first and second ranges. It is useful for all of the memory available to a given component or process to at least appear to be contiguous, and so the processor may include components known as memory management units (MMUs) to translate addresses between those used by the component or process and those actually found in memory.

The MMU is specifically associated with the processor core. The processor core uses virtual addresses, which give the processor core the illusion that the memory available to the processor core is contiguous. The MMU, however, translates these virtual addresses to "real" addresses—that is, the physical addresses actually used by memory. Other components, such as input/output (I/O) devices (e.g., peripheral devices that are integrated with the processor cores on a system on chip (SoC)), also benefit from viewing the memory available to it as being contiguous. For such components, a device similar to the MMU is used, known as the I/O MMU, or more generally the IOMMU. Like the MMU, the IOMMU translates between the addressing scheme used by I/O devices and the physical addressing scheme actually used by memory.

Although MMUs and IOMMUs share similarities, the focus of this disclosure is on the IOMMU. Various IOMMU architectures have been introduced to the market, but these architectures suffer from numerous drawbacks. For example, some IOMMU architectures have unpredictable performance because they require memory accesses to translate addresses whenever the address to be translated fails to find a hit in the IOMMU cache. Particularly for data-intensive and time-critical applications, such as high-definition video, the caches must be especially large to avoid the time delay associated with memory accesses. Other IOMMU architectures suffer from a lack of scalability due to limited address ranges and limited bandwidth, no ability to support virtualization, and no ability to isolate portions (or "areas") of memory accessed by different components or processes.

This disclosure describes various examples of a system on chip (SoC) that includes multiple translation tables, each table having a different architecture with different translation capabilities. In some examples, the SoC includes an MMU that translates addresses for processor cores, and an IOMMU that includes an SMMU, a physical address table (PAT), and a peripheral virtualization unit (PVU). The SoC further includes a routing circuit configured to receive memory access requests from I/O devices (or, more particularly, a direct memory access (DMA) unit dedicated to such I/O devices) and that is configured to route the requests to one or more of the various translation tables based on information contain within the requests (e.g., addresses and programmable attributes within the requests). As described below, portions of the MMU and SMMU are managed by an operating system (OS) and a virtual machine manager, also called a hypervisor. The PAT may be managed by the operating system, and the PVU may be managed by the hypervisor. The routing circuit and the variety of translation capabilities provided by the different translation tables overcome many of the aforementioned disadvantages that exist in other IOMMU architectures.

FIG. 1 depicts a block diagram of an illustrative processor 100, input/output (I/O) master 104, and memory 108 (e.g., RAM) in accordance with an example. These components may be integrated on an SoC 98, although the scope of this disclosure is not limited as such. The processor 100 includes one or more processor cores 102 and a memory management layer 106 coupled to the processor cores 102. The processor cores 102 may include operating system images (OS images) 110, which are loaded during boot-up. Other components may be included in the processor 100 but are not expressly depicted in FIG. 1. The I/O master 104 includes one or more peripheral devices (depicted in FIG. 2), as well as a DMA 210 to service memory access requests by the peripheral devices. The DMA 210 couples to the memory management layer 106. The memory 108 couples to the memory management layer 106. In general, the memory management layer 106 receives memory access requests from the processor cores 102 and the peripheral devices in or associated with the I/O master 104. In response, the memory management layer 106 translates addresses in the memory access requests based on attributes in the requests as well as on the addresses themselves. The translated address is then used to access the appropriate physical addresses in the memory 108. Illustrative details of the components depicted in FIG. 1 are now provided with respect to FIG. 2.

Figure 2:
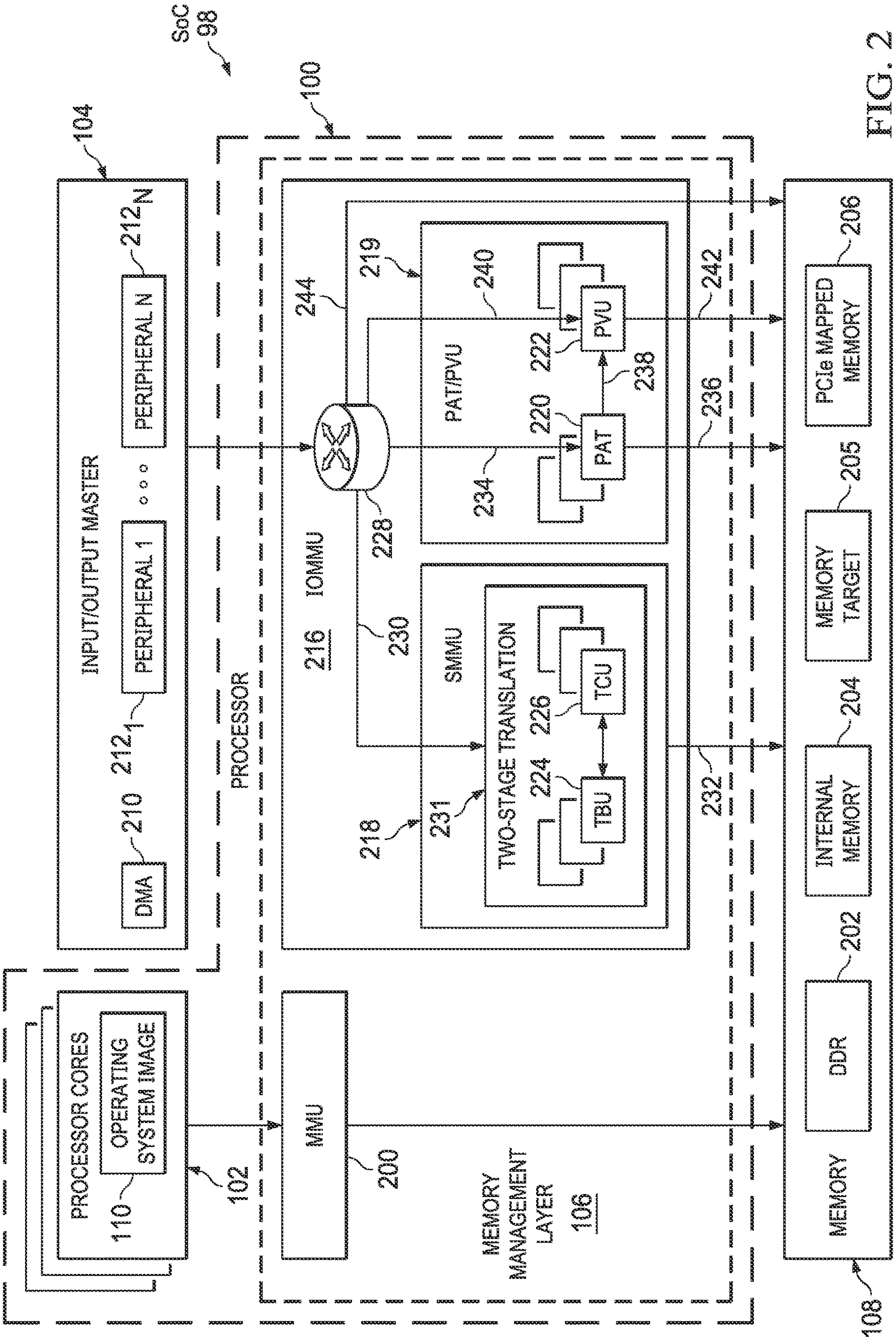
FIG. 2 depicts a block diagram of an illustrative processor and I/O system in accordance with an example.

FIG. 2 depicts a more detailed version of the SoC 98 of FIG. 1. Specifically, FIG. 2 depicts the I/O master 104 containing a DMA 210 and N peripheral devices $\mathbf{212}_1 \ldots \mathbf{212}_N$. (Each of the peripheral devices $\mathbf{212}_1 \ldots \mathbf{212}_N$ may have its own internal, dedicated DMA, but in the example depicted in FIG. 2, the DMA 210 is used to interface with a routing circuit 228 for peripheral devices lacking an internal, dedicated DMA. The routing circuit 228 may be implemented in hardware, executable code, or a combination thereof.) In addition, the memory management layer 106 includes an MMU 200 coupled to the processor cores 102 and to the memory 108. The memory management layer 106 further includes an IOMMU 216 coupled to the I/O master 104 (e.g., to the DMA 210) and to the memory 108. The IOMMU 216 includes the routing circuit 228 that couples to an SMMU 218 as indicated by numeral 230, and to a PAT/PVU unit 219 as indicated by numerals 234, 240. The SMMU 218 couples to the memory 108 as indicated by numeral 232, and the PAT/PVU unit couples to the memory 108 as indicated by numerals 236, 242. The routing circuit 228 couples to the memory 108 directly as indicated by numeral 244. The memory 108, in examples, includes various memory subtypes, such as double data rate synchronous dynamic RAM (DDR SDRAM or, more simply, DDR) 202, internal memory 204, any memory mapped addressable target and peripheral component interconnect express (PCIe) mapped memory 206. The memory 108 may include other sub-types of memory as well, as the generic memory target 205 indicates. The SoC 98 may also include a hypervisor, which may be implemented as executable code, hardware, or a combination of executable code and hardware. Because of this flexibility of implementation, the hypervisor is conceptually depicted in FIG. 4 rather than in FIG. 2. In operation, the MMU 200 translates addresses for memory accesses by the processor cores 102. In addition, the routing circuit 228 receives memory access requests from any IO masters in the system. These memory access requests may be, for example, from any of the peripheral devices $\mathbf{212}_1 \ldots \mathbf{212}_N$ or from the DMA master subsystem 210. The routing circuit 228 is configured to route the memory access request to the SMMU 218, the PAT 220, the PVU 222, or directly to the memory 108 depending on the address contained in the memory access request and one or more attributes contained in the memory access request. (As FIG. 2 depicts, any number of PATs 220 and PVUs 222 may be included in the PAT/PVU unit 219.) In some cases, the combination of address and/or attribute(s) cause the routing circuit 228 to forward the memory access request to the SMMU 218 for address translation. In some cases, the combination of address and/or attribute(s) cause the routing circuit 228 to forward the memory access request to the PAT 220 for address translation. In some cases, the combination of address and/or attribute(s) cause the routing circuit 228 to forward the memory access request to the PVU 222 for address translation. In some cases, the combination of address and/or attribute(s) cause the routing circuit 228 to forward the memory access request to the PAT 220 and then to the PVU 222 for address translation, as numeral 238 indicates. In some examples, memory access requests are not forwarded directly from the PAT 220 to the PVU 222; rather, after an address translation by the PAT 220, the memory access request with translated address is again provided to the routing circuit 228, which then provides the request and translated address to the PVU 222 for a second stage of translation. Similarly, although the numerals 232, 236, and 242 depict direct output of translated addresses to the memory 108, in some examples, these outputs are provided to the routing circuit 228, which in turn may provide the translated (e.g., physical) addresses to the memory 108, as numeral 244 indicates. In the context of such examples, the numerals 232, 236, 238, and 242 are conceptual in nature to facilitate clarity of operation of the memory management layer 106.

The SMMU 218 includes a translation buffer unit (TBU) 224 and a translation control unit (TCU) 226, although in examples, any number of TBUs 224 and TCUs 226 may be included. When an address is received by the SMMU 230 with a memory access request, the SMMU 230 first searches the TBU 224 for a matching address (or "hit"). If a matching address is found, the TBU 224 translates the address. Otherwise, if no matching address is found in the TBU 224, the TCU 226 accesses memory to translate the address, which is a time-consuming process. In this manner, the TBU 224 functions as a cache. As numeral 231 indicates, the SMMU 218 provides a two-stage translation, for example by receiving a virtual address (VA) and translating it to an intermediate physical address (IPA), and then translating the IPA to a physical address (PA).

Figure 3:
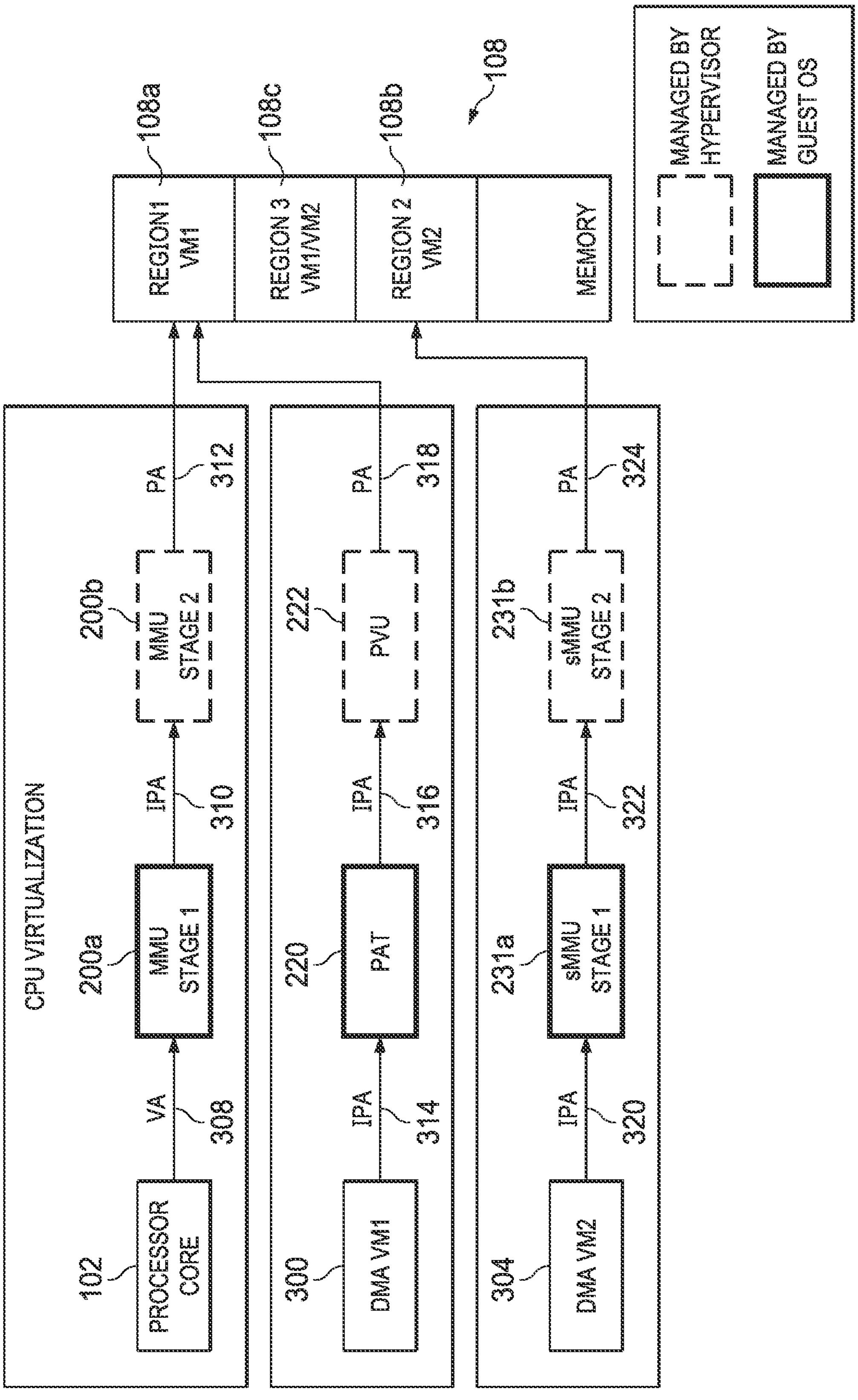
FIG. 3 depicts a conceptual illustration of an aspect of processor operation in accordance with an example.

FIG. 3 depicts a conceptual illustration of an aspect of processor operation in accordance with an example. Specifically FIG. 3 depicts the MMU 200 of FIG. 2 having a first MMU stage 200*a* and a second MMU stage 200*b*. The first MMU stage 200*a* is managed by the OS 110, and the second MMU stage 200*b* is managed by the hypervisor (mentioned above and described below). The MMU stages 200*a*, 200*b* cross-reference various addresses. The MMU stage 200*a* translates VAs to IPAs, and the MMU stage 200*b* translates IPAs to PAs. When a memory access request containing a VA is received (as numeral 308 indicates), the MMU stage 200*a* translates the VA to an IPA, as numeral 310 indicates. The MMU stage 200*b* then translates the IPA to a PA, as numeral 312 indicates. The PA is found in the memory 108, specifically in region of memory 108*a*.

FIG. 3 further depicts a DMA VM1 300, similar to the DMA 210 of FIG. 2. The DMA VM1 300 is allocated to a first VM. Other components on the SoC 98, including hardware (e.g., peripheral devices) and/or executable code, may likewise be allocated to the first VM. FIG. 3 also depicts a DMA VM2 304, similar to the DMA 210 of FIG. 2. The DMA VM2 304 is allocated to a second VM. Other components on the SoC 98, including hardware (e.g., peripheral devices) and/or executable code, may likewise be allocated to the second VM. The DMA VM1 300 issues a memory access request on behalf of its VM, with the memory access request including an IPA, as numeral 314 indicates. The PAT 220, which is managed by the OS 110, translates the received IPA to a different IPA, as numeral 316 indicates. (Such translation from one type of address to the same type of address may be referred to herein as re-direction.) The PVU, which is managed by the hypervisor, translates the received IPA to a PA, as numeral 318 indicates. The PA corresponds to a dedicated region of memory 108*a*, which is isolated from other regions of memory dedicated to other VMs. For example, DMA VM2 304 belongs to a second VM, and it issues IPAs, as numeral 320 indicates. The first SMMU stage 231*a* of the SMMU (which is managed by the OS) receives the IPA and translates the received IPA to a different IPA, as numeral 322 indicates. In addition, the second SMMU stage 231*b* of the SMMU (which is managed by the hypervisor) receives the IPA and translates the received IPA to a PA, as numeral 324 indicates. The PA corresponds to a dedicated region of memory 108*b*, which is isolated from region of memory 108*a* and from any other regions of memory 108 that are dedicated to other VMs. In some examples, the memory 108 includes a region 108*c* that is shared between multiple VMs.

At least some of the advantages realized by the scheme depicted in FIG. 3 include the isolation of memory regions dedicated to different VMs. Traditional systems fail to isolate memory regions between different VMs and between different applications or components belonging to a single VM. The SoC 98 described herein achieves both types of isolation, with the isolation between different VMs achieved by the second stage of translation (e.g., MMU 200*b*, PVU 222, second SMMU stage 231*b*) and the isolation between different applications or components of a single VM achieved by the first stage of translation (e.g., MMU stage 200*a*, PAT 220, first SMMU stage 231*a*). By providing isolation between different VMs, multiple VMs can now be employed, and by providing isolation between applications or other components belonging to a VM, multiple such applications and/or components can be employed. Similarly, the SoC 98 isolates between multiple peripherals that access the memory 108. In addition, by virtue of its address translation capabilities, the SoC 98 causes non-contiguous regions of memory 108 to appear contiguous to components and processes (e.g., processor cores, VMs) accessing the memory 108. These advantages overcome many of the problems with existing IOMMUs, described above.

Figure 4:
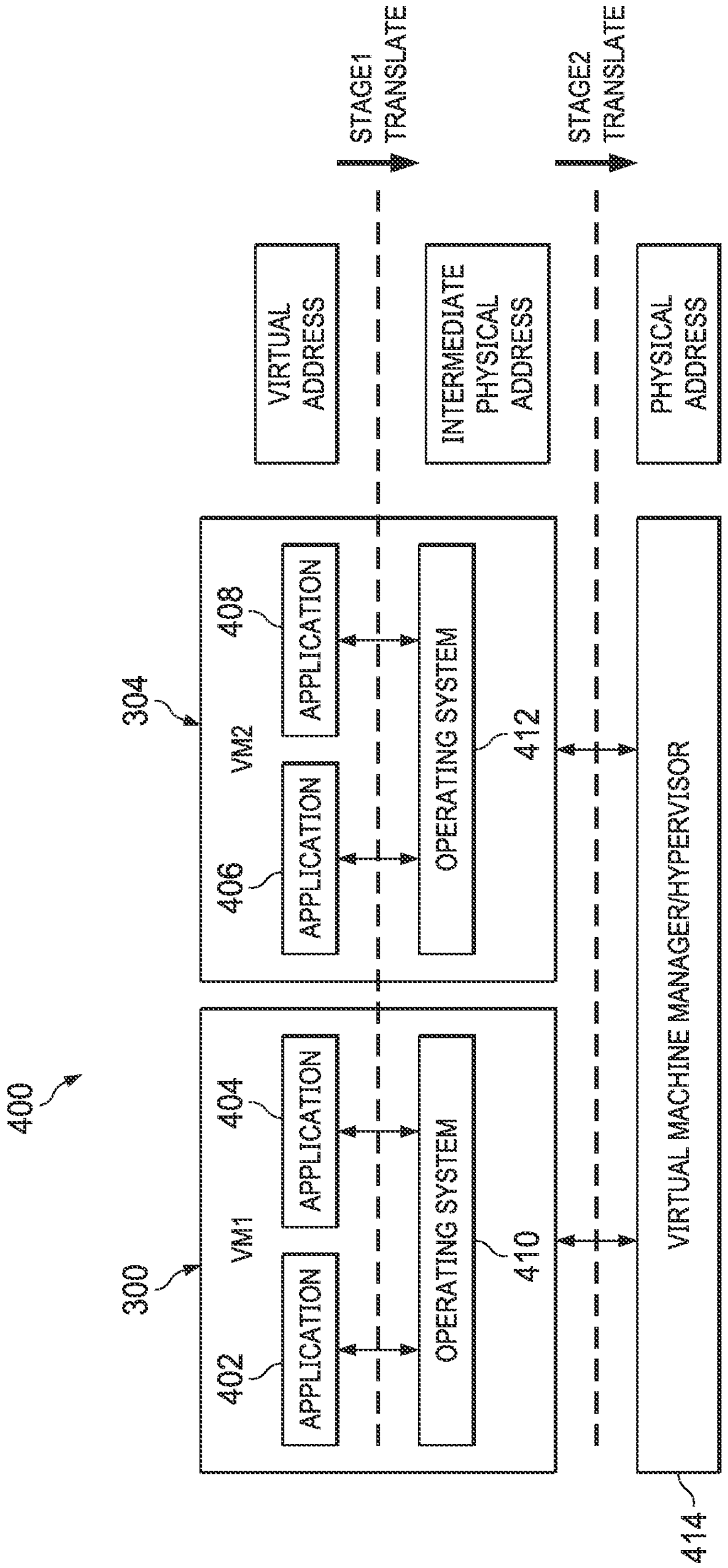
FIG. 4 depicts an illustrative block diagram of multiple virtual machines and a hypervisor in accordance with an example.

FIG. 4 depicts an illustrative block diagram 400 of multiple DMA VMs 300, 304 and a hypervisor 414 in accordance with an example. The DMA VM1 300 has allocated to it (e.g., by any suitable entity, such as a programmer or executable code) a plurality of applications 402, 404 and an OS 410 that manages the applications 402, 404. The DMA VM2 304 has allocated to it a plurality of applications 406, 408 and an OS 412 that manages the applications 406, 408. The hypervisor 414 (also termed virtual machine manager 414) manages both of the VMs 300, 304. As explained above, the hypervisor 414 may be implemented in hardware, executable code, or a combination of hardware and executable code, and the same is true for the VMs 300, 304. The applications 402, 404, 406, and 408 may provide VAs that are translated (e.g., as depicted in FIG. 2) to produce IPAs usable by the OSs 410, 412, and the hypervisor 414 uses PAs that are translated from the IPAs used at the OS level. With such two-stage translation, isolation is achieved between the applications/components within a single VM and isolation is further achieved between multiple different VMs.

Figure 5:
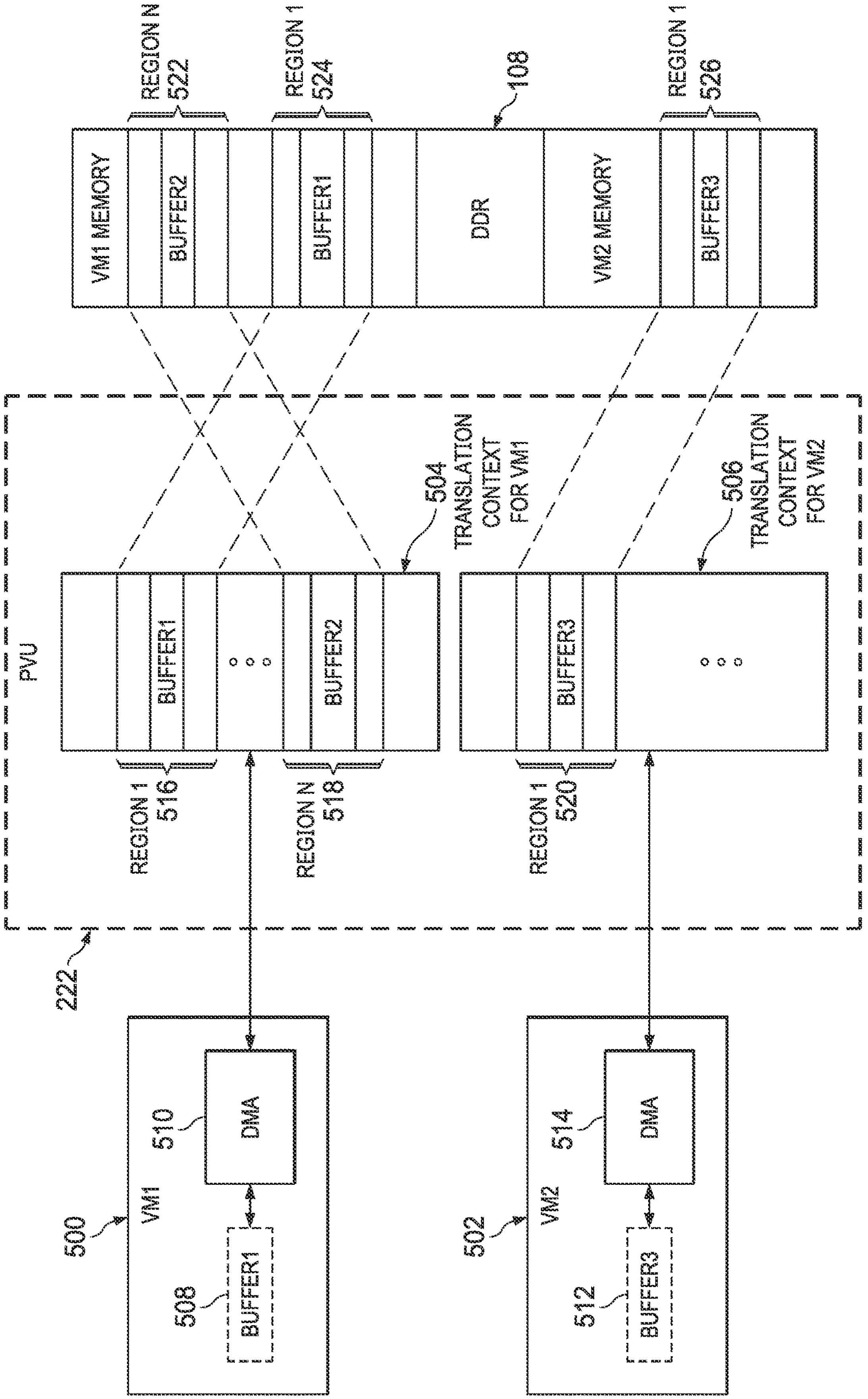
FIG. 5 depicts the contents and operation of an illustrative peripheral virtualization unit (PVU) in accordance with an example.

FIG. 5 depicts the contents and operation of an illustrative peripheral virtualization unit (PVU) 222 in accordance with an example. The PVU 222 receives memory access requests from different VMs 500, 502. The addresses associated with the requests may be stored, for example, in buffers 508, 512, respectively. The VMs 500, 502 contain DMAs 510, 514 that manage memory accesses by the VMs 500, 502. Intervening components between the DMAs and PVU 222, such as the routing circuit 228 (FIG. 2), are omitted in FIG. 5 for ease of explanation.

The PVU 222 depicted in FIG. 5 is a single instance of the PVU 222. In operation, any number of instances of the PVU 222 may be implemented within the SoC 98. A single instance of the PVU 222 may contain one or more translation contexts, with each translation context representing a separate translation table usable independently of other translation contexts. The instance of the PVU 222 depicted in FIG. 5 contains translation contexts 504, 506, which are allocated to VMs 500, 502, respectively. The translation context 504 cross-references IPAs with PAs. As shown, the translation context 504 includes N regions, with a first region labeled with numeral 516 and an Nth region labeled with numeral 518. Each entry in the PVU 222 linearly translates an input address range to an output address range. Each region (e.g., regions 516, 518) may encompass one or more buffers. When a request is to be translated, a PVU entry with a matching address is used to translate to the PA space, assuming access privileges are met. Similarly, the translation context 506 can include multiple regions, although only one region 520 is expressly shown. Each of the regions in the translation contexts 504, 506 corresponds to dedicated regions in memory 108. As shown, the region 516 corresponds to dedicated region 524 in memory 108; the region 518 corresponds to dedicated region 522 in memory 108; and the region 520 corresponds to the dedicated region 526 in memory 108. As also shown, the regions 522 and 524 are contained within an address range dedicated to the VM 500, and the region 526 is contained within an address range dedicated to the VM 502. In this manner, regions of memory 108 dedicated to different VMs remain isolated from each other, as described above. In some instances, a memory access request will find a match in a corresponding translation context. However, in examples, more entries may be useful than are provided in a single translation context. In some such examples, the same translation index (e.g., a common identifier) may be assigned to multiple contexts (e.g., in a linked, or "chained," configuration) so that a search request canvasses the translation context(s) corresponding to that translation index.

The translation scheme depicted in FIG. 5 provides numerous advantages. For example, the PVU 222 provides a deterministic latency for address lookup and translation (e.g., two cycles); the PVU 222 supports multiple VMs using independent translation contexts as depicted in FIG. 5; the PVU 222 supports a flexible layout of VM memory using multiple (e.g., eight) regions per VM; and the use of multiple translation contexts that can be searched in the event that a first translation context does not contain a matching address (as described above) provides support for additional regions per VM.

Figure 6:
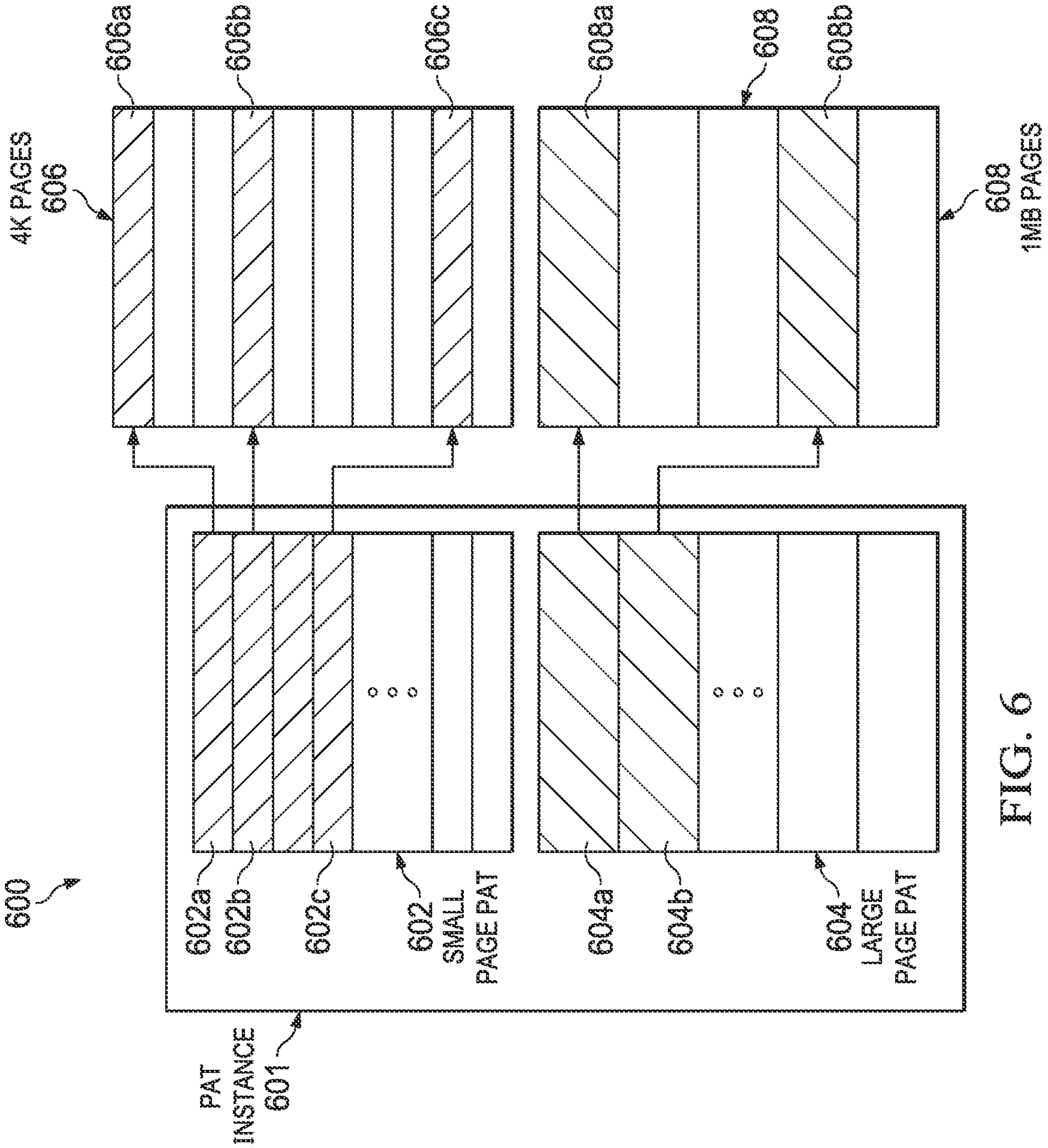
FIGS. 6 and 7 depict the contents and operation of an illustrative physical address table (PAT) in accordance with an example.
Figure 7:
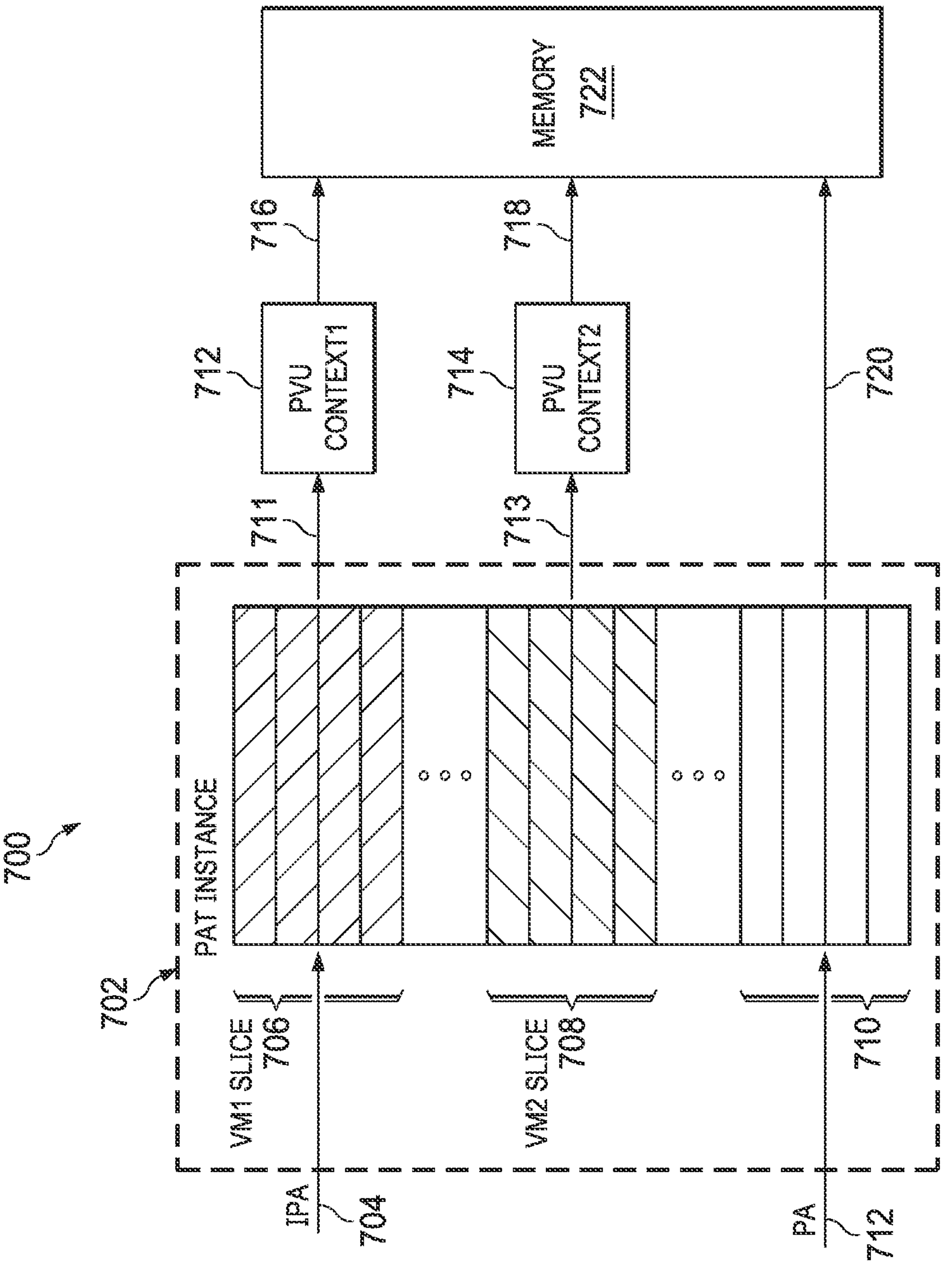

FIGS. 6 and 7 depict the contents and operation of an illustrative physical address table (PAT) in accordance with an example. In particular, FIG. 6 depicts a PAT instance 601, although any number of PAT instances may be used. The PAT instance 601 contains a small page PAT table 602 and a large page PAT table 604. The small page PAT table 602 includes pages 602*a*-602*c* of a relatively small size and the large page PAT table 604 includes pages 604*a*-604*b* of a relatively large size. As shown, the pages 602*a*-602*c* correspond to small pages 606*a*-606*c*, respectively, in a region of memory 600, which the pages 604*a*-604*b* correspond to large pages 608*a*, 608*b*, respectively, in a region of memory 608. The pages 606*a*-606*c* may be, e.g., 4K in size, while the pages 608*a*, 608*b* may be, e.g., 1 MB in size.

FIG. 7 depicts another example 700 including a PAT instance 702. The PAT instance 702 includes multiple regions 706, 708, and 710. The entries of the PAT instance 702 are divided at a fixed granularity (e.g., entries of 2 kilobyte size), with access to each of the regions restricted to a specific entity (e.g., VM), such as by a hardware firewall. In addition, a portion of the PAT instance 702 translates IPAs to other IPAs, while other portions of the PAT instance 702 translate PAs to other PAs. Accordingly, for translation purposes, the regions 706 and 708 cross-reference IPAs with other IPAs, and the region 710 cross-references PAs with other PAs. To this end, numeral 704 depicts the region 706 receiving a memory access request with an IPA, and numeral 712 depicts the region 710 receiving a memory access request with a PA. The translation output provided by the region 706, indicated by numeral 711, is an IPA. Similarly, the translation output provided by the region 708, indicated by numeral 713, is an IPA. Numeral 720 indicates a translated address output from the region 710 that is a PA. Because outputs 711 and 713 are IPAs, they are to be translated to PAs 716, 718 by the PVU contexts 712, 714 before they can be used to access memory 722. This second-stage translation is conceptually depicted by numeral 238 in FIG. 2 and numerals 220, 222 in FIG. 3. In contrast, the output 720 is already a PA, and so no further translation is necessary to access the memory 722.

The schemes depicted in FIGS. 6 and 7 provide multiple advantages. For example, the use of differing PAT page sizes that are configurable by executable code provide flexibility to address diverse buffer allocation needs. The schemes also facilitate the handling of concurrent memory access requests from both virtualized and non-virtualized peripheral devices. The schemes also provide a low, deterministic latency (e.g., two cycles), which is particularly useful in applications such as high-definition video that requires predictably fast address translation.

Figure 8:
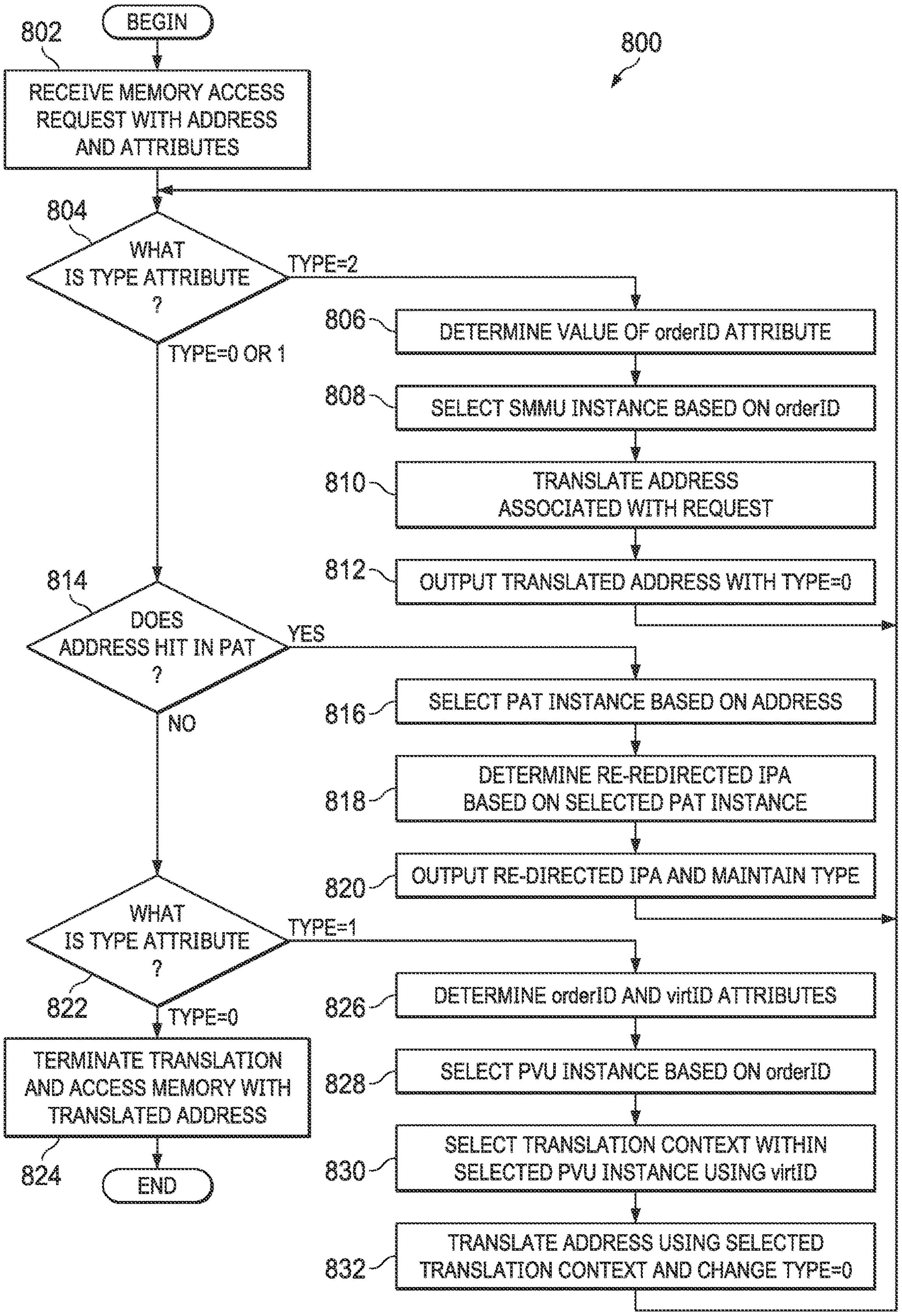
FIG. 8 depicts a flow diagram of an illustrative method of operation for a processor in accordance with an example.

FIG. 8 depicts a flow diagram of an illustrative method 800 for a processor in accordance with an example, such as for the processor 100 of FIG. 1. Thus, FIGS. 1 and 8 are now described in parallel. The method 800 begins with the routing circuit 228 receiving a memory access request (e.g., via a peripheral device) that includes an address and one or more attributes (802). Such attributes may include a type attribute, which is used to determine the translation unit to which a particular memory access request is to be routed. Attributes may also include an additional attribute (referred to herein as an orderID attribute), which is usable to select instances of translation units, e.g., the selection of a particular SMMU instance or a particular PVU instance for address translation purposes. Attributes may also include a virtID attribute, which is usable to select a particular translation context within a PVU instance for address translation purposes. These attributes are dynamically configurable by executable code. The request may be received from, e.g., one of the peripherals $\mathbf{212}_1 \ldots \mathbf{212}_N$ via the DMA 210.

The method 800 then includes determining the value of the type attribute (804). Any scheme may be used for the values of the various attributes described above. In the present example, the type attribute is assigned values of 0, 1, or 2. If the type attribute is determined to have a value of 2, the method 800 includes determining the value of the orderID attribute (806). The method 800 further includes selecting an SMMU instance (e.g., of the SMMU 230) based on the orderID attribute (808). The method 800 includes translating the address associated with the request by the SMMU instance (810). As described above, the TBU 224 is first searched for the address in the request, and if no cache hit is found, the TCU 226 is used to search memory 108 for the address and a corresponding translation. In either case, the SMMU instance performs a two-stage translation, as described above. The method 800 includes outputting the translated address and changing the type value to 0 (812). Control of the method 800 then returns to 804.

If, however, the type attribute is determined to be 0 or 1 at 804, the method 800 includes determining whether the address finds a matching entry in the PAT (e.g., PAT 220) (814). If so, the method 800 includes selecting a PAT instance based on the address (816) and determining a re-directed IPA using the selected PAT instance (818), as described above. The method 800 then includes outputting the re-directed IPA and maintaining the existing type (820). Control of the method 800 then returns to 804.

If, at 814, there is no address hit in the PAT, the method 800 includes determining the precise type value (822). If the type value is 1, the method 800 includes determining the orderID and virtID attributes associated with the memory access request (826). The method 800 then includes selecting a PVU instance (e.g., an instance of PVU 222) based on the orderID (828), and selecting a translation context within the PVU instance based on the virtID (830). The method 800 subsequently includes translating the address using the selected translation context and changing the type value to 0 (832), as described above. Control of the method 800 then returns to 804.

As explained above, in FIG. 2 the numerals 232, 236, 238, and 242 are conceptual in nature and are included (in the case of 232, 236, and 242) to depict the fact that translation outputs are used to access memory, and in the case of 238 to depict the fact that a translated address provided by the PAT 220 can again be translated by the PVU 222. In actual operation, when a translation is complete by the SMMU 218, the type is set to 0 and the request is again processed by the routing circuit 228. Because the type is 0, the method 800 (FIG. 8) includes terminating the translation and accessing memory using the translated address (824). Similarly, when a translation is complete by the PAT 220 and the translated address is an IPA that is to be translated again to a PA, the type is unchanged (820) and the request is again processed by the routing circuit 228. This time, however, the translated IPA finds no matching address in the PAT 220, and so the type causes the PVU 222 to translate the IPA to a PA (822-832). In this case, the request is again processed by the routing circuit 228, at which point the 0 type causes the translation to terminate (824). Likewise, if the address accompanying the memory access request is a PA, the 0 type associated with the request is maintained (826), and when the routing circuit 228 again processes the request, the translation process terminates (824).

Figure 9:
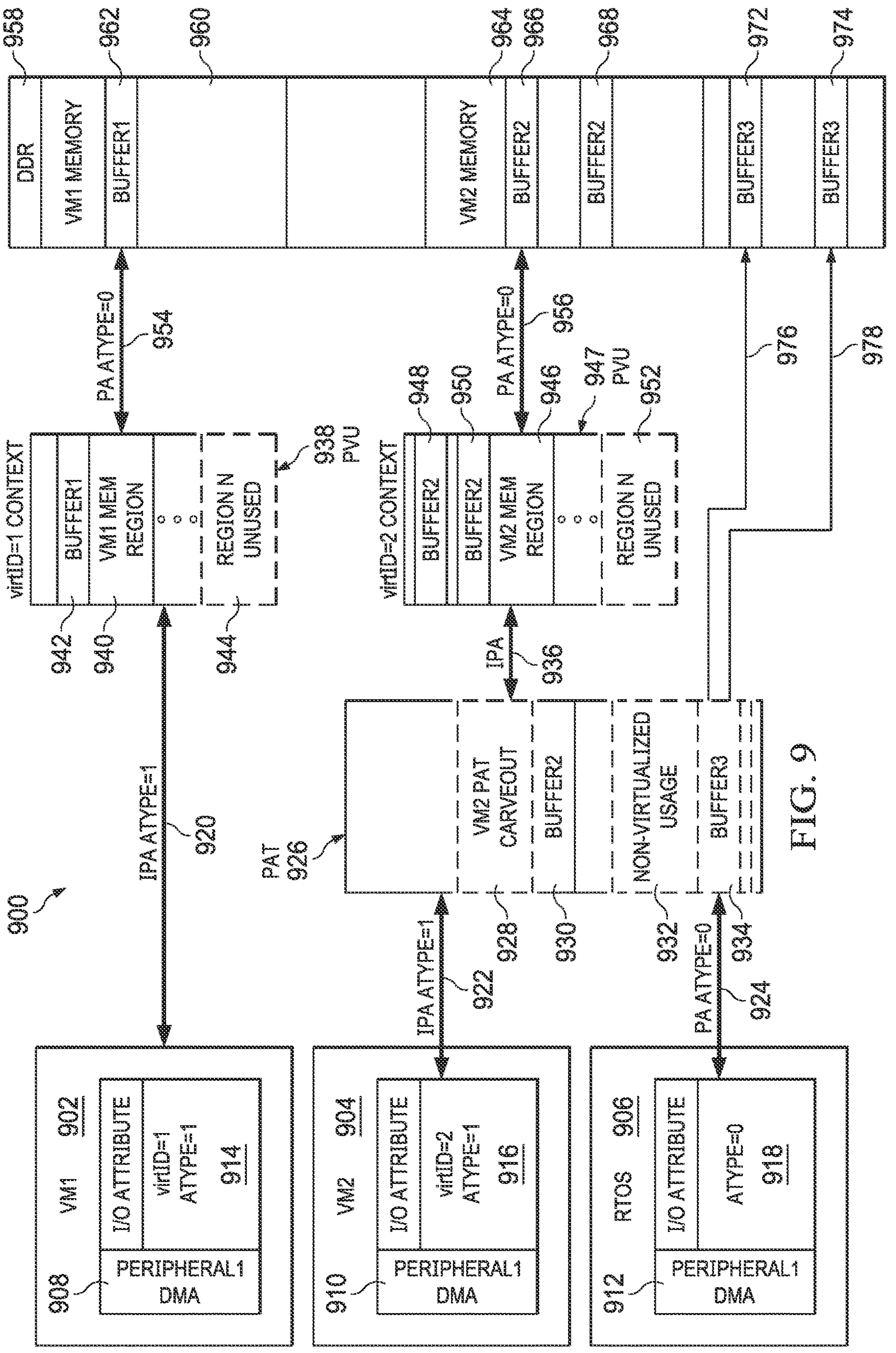
FIG. 9 depicts the contents and operation of an illustrative processor in accordance with an example.

FIG. 9 depicts illustrative contents and operation of a processor 900 in accordance with an example. The processor 900 is similar in at least some aspects to the processor examples described above. The processor 900 includes VMs 902, 904 and a real-time operating system (RTOS) 906. DMAs 908, 910, 912 are allocated to the VMs 902, 904 and the RTOS 906, respectively. The DMAs 908, 910, 912 issue memory access requests 914, 916, 918, respectively. Memory access request 914 includes a type attribute value of 1 and a virtID attribute value of 1. Memory access request 916 includes a type attribute value of 1 and a virtID attribute value of 2. Memory access request 918 includes a type attribute of 0. The addresses associated with the memory access requests 914, 916, 918 are IPAs, IPAs, and PAs, respectively, as numerals 920, 922, and 924 indicate, respectively. The processor 900 further includes a PAT instance 926. The PAT instance 926 includes a region 928 that is dedicated to VM 904, and this region 928 includes a buffer 930. A portion 932 of the PAT instance 926 is allocated to non-virtualized use and thus cross-references PAs with other PAs. This portion 932 includes a buffer 934. The processor 900 further includes a PVU instance translation context 938 and a PVU instance translation context 947. The translation context 938 includes a region 940 dedicated to the VM 902, as well as an unused region 944. The translation context 947 includes a region 946 dedicated to the VM 904, as well as an unused region 952. The region 940 in translation context 938 includes a buffer 942. The region 946 in translation context 947 includes a non-contiguous buffer denoted by numerals 948 and 950. The processor 900 couples to a memory 958, which includes a region 960 dedicated to the VM 902 and containing a buffer 962, a region 964 dedicated to the VM 904 and containing a non-contiguous buffer denoted by numerals 966, 968, and a buffer in non-dedicated memory denoted by numerals 972, 974.

In operation, the DMA 908 issues the memory access request 914. Because the type value is 1 and further because the IPA associated with the request finds no matching addresses in the PAT instance 926, the translation context 938 is used to translate the IPA to a PA, making the address suitable for accessing memory 958. Specifically, the buffer 942 in the region 940 is accessed, since the region 940 is dedicated to the VM 902. The translation context 938 is specifically identified using the virtID, which has a value of 1. The translated PA is used to access the buffer 962 in the region 960, as numeral 954 indicates.

Further in operation, the DMA 910 issues the memory access request 916. The IPA associated with the memory access request 916 finds a matching address in the PAT instance 926—specifically, in the buffer 930 of the region 928, which is dedicated to the VM 904. The translated address is an IPA as indicated by numeral 936, and because the type value is 1 and the IPA in the memory access request 916 found a matching address in the PAT instance 926, the translated IPA is further translated using the translation context 947 (specifically, the non-contiguous buffer denoted by numerals 948, 950 of the translation context 947). The result is a translated address that is a PA, and this PA has a re-assigned type value of 0, as numeral 956 indicates. As a result, the translation process is terminated, and the translated PA is used to access the memory 958—specifically, the non-contiguous buffer denoted by numerals 966, 968.

Further in operation, the DMA 912 issues the memory access request 918. The PA associated with the memory access request 918 finds a matching address in the PAT instance 926—specifically, in the buffer 934 of the non-virtualized usage region 932. Because the type value is 0, the translation process terminates, and the translated PA is used to access the non-contiguous buffer denoted by numerals 972, 974, as numerals 976 and 978 indicate, respectively. One or more of the PATs described herein may contain one or more PAs and/or IPAs that are the same as one or more PAs and/or IPAs in other parts of the system, such as an SMMU. Similarly, one or more of the PATs described herein may contain one or more PAs and/or IPAs that are different than one or more PAs and/or IPAs in other parts of the system, such as an SMMU.

As mentioned above, the subject matter described herein provides numerous advantages over current IOMMUs, including deterministic latency (e.g., 2 cycles), flexible PAT page sizes, multiple SMMU, PAT, and PVU instances to support higher bandwidth and a greater available address range, multi-stage translation (e.g., PAT and PVU) to support virtualization, and isolation of dedicated memory regions, as described above. The subject matter is particularly useful in certain applications, such as automotive processors. In such applications, a SoC may implement different functions, such as automated driving and entertainment, where one of the functions is safety-critical and the other is not, but both benefit from deterministic, low-latency address translation, isolation of memory regions and translation regions. The scope of this disclosure, however, is not limited to application in automotive processing contexts, and any of a variety of applications are contemplated and included within the scope of this disclosure.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A device comprising:

a routing circuit; and a set of translation circuits coupled to the routing circuit, wherein:

the routing circuit is configured to cause a memory request to be provided to a first translation circuit from among the set of translation circuits based on an attribute of the memory request;

the first translation circuit is configured to:

determine whether a first address associated with the memory request corresponds to a hit in an address translation table; and based on the first address corresponding to a miss in the address translation table, determine based on the attribute, whether the first address is an intermediate address;

the set of translation circuits includes a second translation circuit configured to, based on the attribute specifying that the first address is an intermediate address, determine a second address based on the first address; and the routing circuit is configured to determine, based on the attribute of the memory request, whether to cause the second translation circuit to determine the second address.

2. The device of claim 1, wherein:

the attribute is a first attribute;

the memory request has a second attribute associated with a virtual machine associated with the memory request; and the second translation circuit is configured to:

store a set of contexts; and select a context for determining the second address from among the set of contexts based on the second attribute.

3. The device of claim 1, wherein:

the attribute is a first attribute; and the memory request includes a second attribute that specifies the second translation circuit from among the set of translation circuits.

4. The device of claim 1, wherein:

the memory request includes an address; and the routing circuit is configured to cause the memory request to be provided to the first translation circuit further based on the address of the memory request.

5. The device of claim 1, wherein:

the address translation table is configured to be managed by an operating system; and the determining of the second address by the second translation circuit is based on a hypervisor.

6. The device of claim 1, wherein the routing circuit is configured to provide the memory request between the first translation circuit and the second translation circuit.

7. The device of claim 1, wherein, based on the attribute specifying that the first address is not an intermediate address, the first translation circuit is configured to provide the first address to a memory.

8. The device of claim 1, wherein:

the routing circuit is configured to couple to a set of peripherals; and the routing circuit is configured to receive the memory request from the set of peripherals.

9. The device of claim 1, wherein the second translation circuit is configured to modify the attribute of the memory request to specify that the second address is not an intermediate address.

10. A device comprising:

a set of processor cores configured to execute an operating system and a hypervisor;

a routing circuit configured to couple to a set of peripherals and to receive a memory request from the set of peripherals; and a set of translation circuits coupled to the routing circuit, wherein:

the routing circuit is configured to cause the memory request to be provided to a first translation circuit from among the set of translation circuits based on an attribute of the memory request;

the first translation circuit is configured to:

determine whether a first address is a miss in an address table that is based on the operating system; and based on the first address being a miss in the address table, determine, based on the attribute, whether the first address is an intermediate address;

the set of translation circuits includes a second translation circuit configured to, when the attribute specifies that the first address is an intermediate address, determine a second address for the first address based on the hypervisor; and the routing circuit is configured to determine, based on the attribute of the memory request, whether to cause the second translation circuit to determine the second address.

11. The device of claim 10, wherein;

the attribute is a first attribute;

the set of processor cores are configured to execute a virtual machine;

the memory request is associated with the virtual machine;

the memory request has a second attribute that is associated with the virtual machine; and the second translation circuit is configured to:

store a set of contexts; and select a context for determining the second address from among the set of contexts based on the second attribute.

12. The device of claim 10, wherein:

the attribute is a first attribute; and the memory request includes a second attribute that specifies the second translation circuit from among the set of translation circuits.

13. The device of claim 10, wherein:

the memory request includes an address; and the routing circuit is configured to cause the memory request to be provided to the first translation circuit further based on the address of the memory request.

14. The device of claim 10, wherein the routing circuit is configured to provide the memory request between the first translation circuit and the second translation circuit.

15. The device of claim 10 further comprising a memory coupled to the set of translation circuits, wherein the first translation circuit is configured to, when the attribute specifies that the first address is not an intermediate address, provide the first address to the memory.

16. The device of claim 10, wherein the second translation circuit is configured to, when the attribute specifies that the first address is an intermediate address, modify the attribute to specify that the second address is not an intermediate address.

17. A method comprising:

receiving, at a routing circuit, a first memory request that specifies a first address and a first attribute;

providing, using the routing circuit, the first memory request to a first translation circuit of a set of translation circuits based on the first attribute;

determining, using the first translation circuit, whether the first address is a miss in an address translation table;

based on the first address being a miss in the address translation table, determining, based on the first attribute, whether the first address is an intermediate address;

based on the first attribute specifying that the first address is an intermediate address:

routing the first address to a second translation circuit;

determining, using the second translation circuit, a second address for the first address; and performing the first memory request using the second address;

receiving, at the routing circuit, a second memory request that specifies a third address and a second attribute;

providing, using the routing circuit, the second memory request to the first translation circuit based on the second attribute;

determining, using the first translation circuit, whether the third address is a miss in the address translation table;

based on the third address being a miss in the address translation table, determining, based on the second attribute, whether the third address is an intermediate address; and based on the second attribute specifying that the third address is not an intermediate address, performing the second memory request using the third address.

18. The method of claim 17, wherein:

the first memory request has a third attribute that is associated with a virtual machine associated with the first memory request; and the method further comprises selecting a context from among a set of contexts for the determining of the second address based on the third attribute.

19. The method of claim 17, wherein:

the first memory request includes a third attribute that specifies the second translation circuit from among the set of translation circuits.

20. The method of claim 17, wherein:

the address translation table is based on an operating system; and the determining of the second address by the second translation circuit is based on a hypervisor.

* * * * *